United States Patent
Ohnishi et al.

(10) Patent No.: US 10,033,299 B2
(45) Date of Patent: Jul. 24, 2018

(54) CONVERTER AND POWER CONVERSION DEVICE INCLUDING THE SAME

(71) Applicants: TOSHIBA MITSUBISHI-ELECTRIC INDUSTRIAL SYSTEMS CORPORATION, Chuo-ku (JP); Mitsubishi Electric Corporation, Chiyoda-ku (JP)

(72) Inventors: Keisuke Ohnishi, Chuo-ku (JP); Masahiro Kinoshita, Chuo-ku (JP); Kimiyuki Koyanagi, Chiyoda-ku (JP)

(73) Assignees: TOSHIBA MITSUBISHI-ELECTRIC INDUSTRIAL SYSTEMS CORPORATION, Chuo-ku (JP); Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/567,134

(22) PCT Filed: Apr. 20, 2015

(86) PCT No.: PCT/JP2015/061959
§ 371 (c)(1),
(2) Date: Oct. 17, 2017

(87) PCT Pub. No.: WO2016/170569
PCT Pub. Date: Oct. 27, 2016

(65) Prior Publication Data
US 2018/0131289 A1    May 10, 2018

(51) Int. Cl.
*H02M 7/217* (2006.01)
(52) U.S. Cl.
CPC ................ *H02M 7/2176* (2013.01)

(58) Field of Classification Search
CPC .... H02M 7/217; H02M 7/2176; H02M 7/487; H02M 3/155; H02M 3/156–3/158;
(Continued)

(56) References Cited

U.S. PATENT DOCUMENTS

2006/0076940 A1* 4/2006 Kawabata ............... G06F 1/32
323/282
2006/0082349 A1* 4/2006 Peron ................. G01R 19/175
323/235
(Continued)

FOREIGN PATENT DOCUMENTS

EP         2802066 A2    11/2014
JP      2011-078296 A      4/2011
(Continued)

OTHER PUBLICATIONS

International Search Report dated Jun. 30, 2015 in PCT/JP2015/061959, filed on Apr. 20, 2016.

*Primary Examiner* — Yemane Mehari
(74) *Attorney, Agent, or Firm* — Oblon, McClelland, Maier & Neustadt, L.L.P.

(57) ABSTRACT

A converter includes a first diode (D1) having its anode and cathode connected to input terminal (T0) and a first output terminal (T1), respectively, a second diode (D2) having its anode and cathode connected to a second output terminal (T2) and an input terminal (T0), respectively, and a bidirectional switch connected between the input terminal (T0) and a third output terminal (T3). The bidirectional switch includes third to sixth diodes (D3 to D6) and a transistor (Q1). The first diode (D1), the second diode (D2), and the transistor (Q) are each formed of a wide-bandgap semiconductor, and the third to sixth diodes (D3 to D6) are each formed of a semiconductor other than wide-bandgap semiconductors.

11 Claims, 10 Drawing Sheets

(58) Field of Classification Search
CPC .......... H02M 1/4208; H02M 2001/009; H03K 17/08; Y02B 70/126; G05F 1/10; G05F 1/40; G01R 19/175
USPC ............... 363/126, 210, 235, 282, 311, 352; 323/210, 235, 282, 311, 352
See application file for complete search history.

(56) References Cited

U.S. PATENT DOCUMENTS

| | | | | |
|---|---|---|---|---|
| 2010/0277837 | A1* | 11/2010 | Myhre | ................ H02M 1/4225 361/18 |
| 2014/0334208 | A1 | 11/2014 | Nguyen | |
| 2017/0237359 | A1* | 8/2017 | Ohnishi | ................ H02M 7/537 363/131 |

FOREIGN PATENT DOCUMENTS

| | | |
|---|---|---|
| JP | 2012-186946 A | 9/2012 |
| JP | 5664819 B1 | 2/2015 |
| JP | 2015-107043 A | 6/2015 |

* cited by examiner

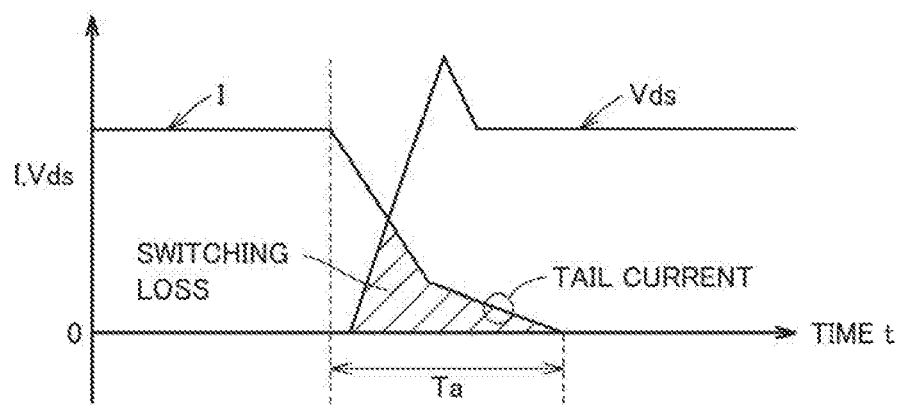
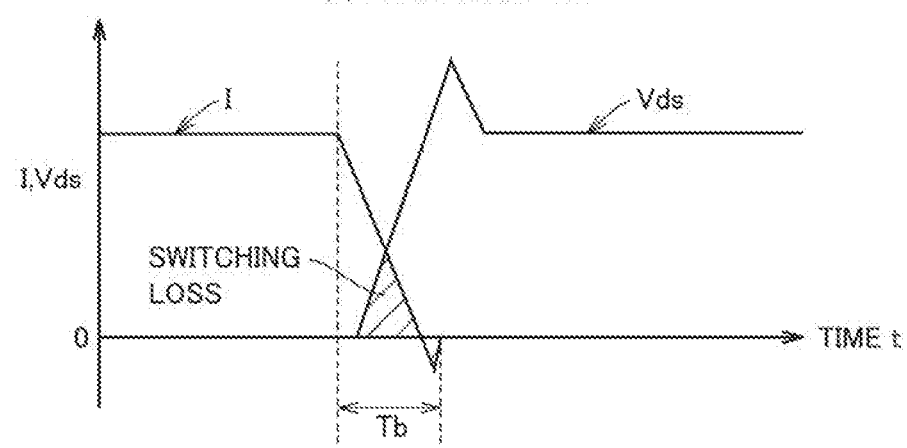
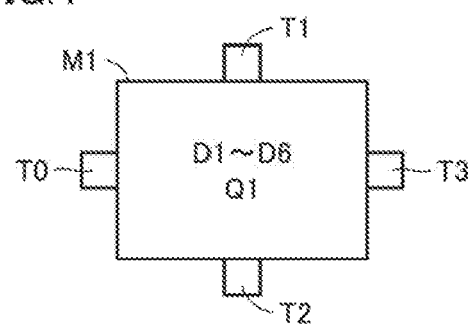

CONVERTER AND POWER CONVERSION DEVICE INCLUDING THE SAME

TECHNICAL FIELD

The present invention relates to a converter and a power conversion device including the same, and more specifically to a converter that converts alternating current (AC) voltage into first to third direct current (DC) voltages and a power conversion device including the same.

BACKGROUND ART

Japanese Patent Laying-Open Mo. 2011-78296 (PTD 1) discloses a converter including four transistors and six. diodes to convert AC voltage into high voltage, low voltage, and intermediate voltage. In this converter, among the six diodes, two diodes performing reverse recovery operation are formed of a wide-bandgap semiconductor, thereby achieving reduction of recovery loss in addition, four diodes that do not perform reverse recovery operation are formed of a semiconductor other than wide-bandgap semiconductors, thereby achieving lower costs.

CITATION LIST

Patent Document

PTD 1: Japanese Patent Laying-Open No. 2011 -78296

SUMMARY OF INVENTION

Technical Problem

Unfortunately, the conventional converter includes many semiconductor elements and therefore has a larger size and costs much. Moreover, the loss in four transistors is large.

The main object of the present invention is therefore to provide a compact and low-cost converter with small loss and a power conversion device including the same.

Solution to Problem

A converter according to the present invention converts alternating-current voltage applied to an input terminal into first to third direct-current voltages to be output to first to third output terminals, respectively. The converter includes a first diode having an anode and a cathode connected to the input terminal and the first output terminal, respectively, a second diode having an anode and a cathode connected to the second output terminal, and the input terminal, respectively, and a first bidirectional switch connected between the input terminal and the third output terminal. The first direct-current voltage is higher than the second direct-current voltage, and the third direct-current voltage is an intermediate voltage between the first direct-current voltage and the second direct-current voltage. The first bidirectional switch includes third to sixth diodes and a first transistor. The third and fourth diodes have anodes connected to the input terminal and the third output terminal, respectively, and have cathodes connected together to a first elect rode of the first transistor. The fifth and sixth diodes have cathodes connected to the input terminal and the third output terminal, respectively, and have anodes connected together to a second electrode of the first transistor. The first transistor is turned on and off in a predetermined cycle. The first diode, the second diode, and the first transistor are each formed of a wide-bandgap semiconductor. The third to sixth diodes are each formed of a semiconductor other than wide-bandgap semiconductors.

Advantageous Effects of Invention

The converter according to the present invention is constituted with one transistor and six diodes. Since the number of semiconductor elements is thus fewer than the conventional one, size reduction and lower costs of the device can be achieved. Furthermore, since the first and second diodes that perform reverse recovery operation and the first transistor that switches current a reformed of a wide-bandgap semiconductor, reduction of switching loss and recovery loss can be achieved. Since the third to sixth diodes that do not perform reverse recovery operation are formed of a semiconductor other than wide-bandgap semiconductors, lower costs can be achieved.

BRIEF DESCRIPTION OF DRAWINGS

FIG. 3 is a time chart for explaining switching loss of the transistor shown in FIG. 1.

FIG. 4 is a block diagram showing the configuration of the semiconductor module included in the converter shown in FIG. 1.

DESCRIPTION OF EMBODIMENTS

First Embodiment

Figure 1:
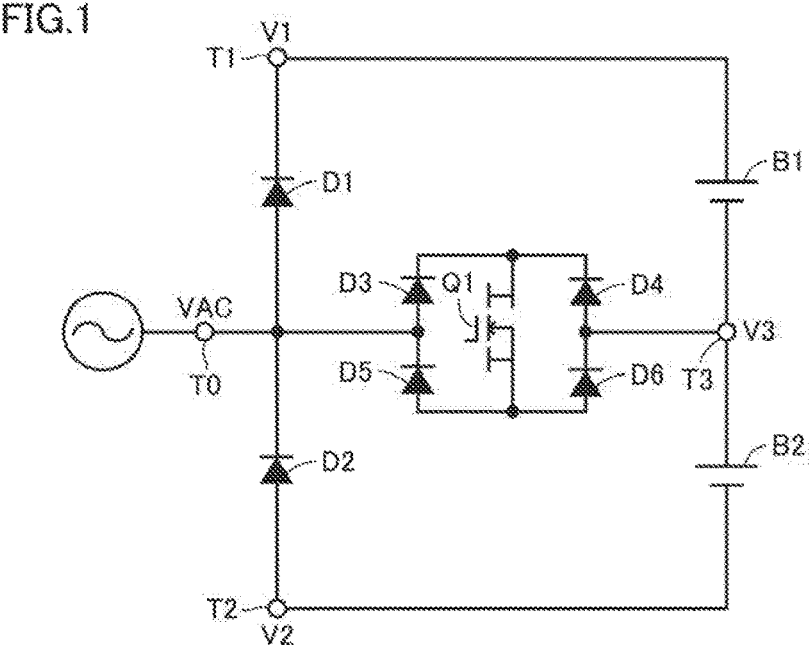
FIG. 1 is a circuit diagram showing the configuration of a converter according to a first embodiment of the present invention.

FIG. 1 is a circuit diagram showing the configuration of a converter according to a first embodiment of the present invention. In FIG. 1, this converter includes an input terminal T0, output terminals T1 to T3, diodes D1 to D6, and a transistor Q1.

The input terminal T0, for example, receives AC voltage VAC of a commercial frequency from a commercial AC power source 10. Output terminals T1, T3 are connected with the positive electrode and the negative electrode of a battery B1, respectively. Output terminals T3, T2 are connected with the positive electrode and the negative electrode of a battery B2, respectively. Each of batteries B1, B2 stores DC power. Batteries B1 and B2 are charged with DC voltage of the same value.

When the voltages at output terminals T1, T2, T3 are DC voltages V1, V2, V3, respectively, V1>V3>V2 holds, which can be written into V3=(V1+V2)/2. This converter converts AC voltage VAC applied to input terminal T0 into DC voltages V1 to V3 to be output to output terminals T1 to T3, respectively. If output terminal T3 is grounded, DC voltages V1 to V3 are to be positive voltage, negative voltage, and 0 V, respectively.

Each of diodes D1, D2 is a Schottky barrier diode formed of SiC (silicon carbide) which is a wide-bandgap semiconductor. The rated current of each diode D1, D2 is, for example, 600 A and is larger than the rated current of each of diodes D3 to D6 and transistor Q1.

Each of diodes D3 to D6 is formed of Si (silicon) which is a semiconductor other than wide-bandgap semiconductors. The rated current of each of diodes D3 to D6 is, for example, 450 A.

Transistor Q1 is an n-channel MOS transistor formed of SIC (silicon carbide) which is a wide-bandgap semiconductor. The rated current of transistor Q1 is, for example, 500 A.

The reason why the specifications of diodes D1, D2, the specifications of diodes D3 to D6, and the specifications of transistor Q1 differ as described above will be described later.

Diode D1 has its anode connected to input terminal T0 and its cathode connected to output terminal T1 (first output terminal). Diode D2 has its anode connected to output terminal T2 (second output terminal) and its cathode connected to input terminal T0.

Diodes D3, D4 have their anodes connected to input terminal T0 and output terminal T3 (third output terminal), respectively, and their cathodes connected to each other. Diodes D5, D6 have their cathodes connected to input terminal T0 and output terminal T3, respectively; and their cathodes connected to each other.

Transistor Q1 has its drain (first electrode) connected to the cathodes of diodes D3, D4 and its source (second electrode) connected to the cathodes of diodes D5, D6. Diodes D3 to D6 and transistor Q1 constitute a first bidirectional switch connected between input terminal T0 and output terminal T3.

Figure 2:
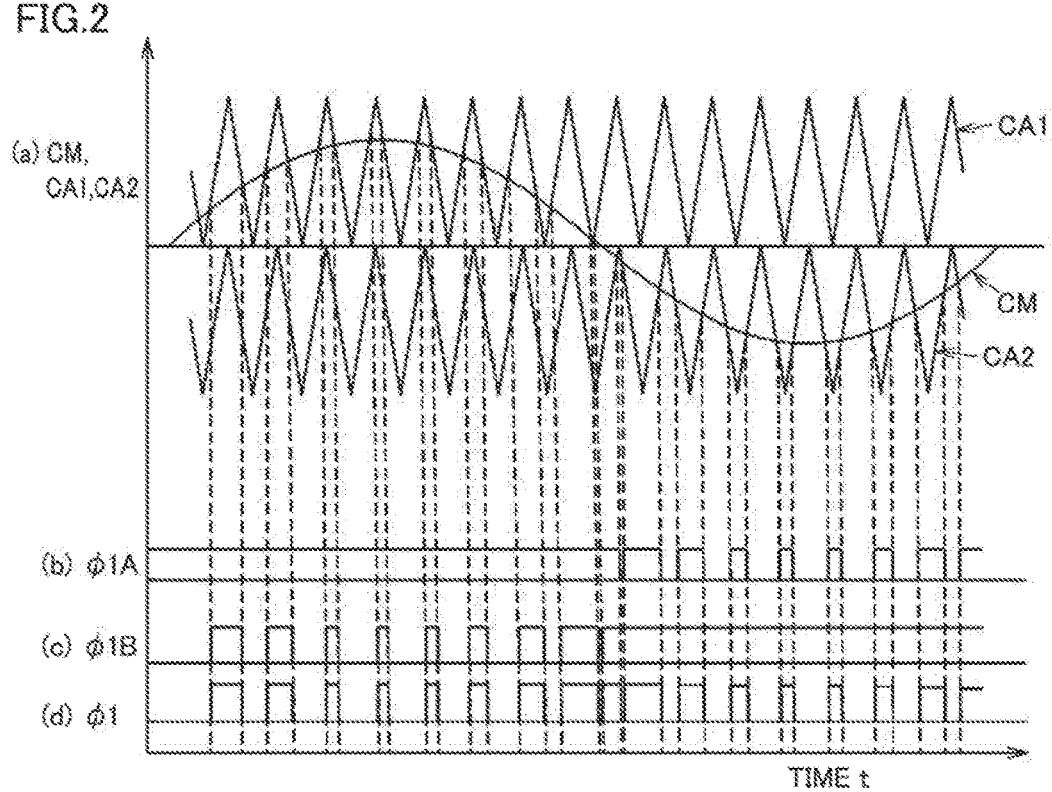
FIG. 2 is a time chart showing the waveform of a PWM signal for controlling the transistor shown in FIG. 1.

The operation of this converter will now be described. A PWM (pulse width modulation) signal φ is applied from a control device (not shown) to the gate of transistor Q1. FIGS. 2(a) to (d) are diagrams showing the generation method and the waveform of PWM signal φ1. In particular, FIG. 2(a) shows the waveforms of sine-wave command value signal CM, positive-side triangular wave carrier signal CA1, and negative-side triangular wave carrier signal CA2, and FIGS. 2(b) to (d) show the waveforms of PWM signals φ1B, φ1, respectively.

In FIGS. 2(a) to (d), the frequency of sine-wave command value signal CM is, for example, a commercial frequency. The phase of sine-wave command value signal CM is, for example, the same as the phase of AC voltage VAC of a commercial frequency. Carrier signals CA1, CA2 have the same cycle and phase. The cycle of carrier signals CA1, CA2 is sufficiently smaller than the cycle of sine-wave command value signal CM.

The level of sine-wave command value signal CM is compared with the level of positive-side triangular wave carrier signal CA1. When the level of sine-wave command value signal CM is higher than the level of positive-side triangular wave carrier signal CA1, PWM signal φ1B is set to "L" level. When the level of sine-wave command value signal CM is lower than the level of positive-side triangular wave carrier signal CA1, PWM signal φ1B is set to "H" level.

Therefore, in the period during which the level of sine-wave command value signal CM is positive, PWM signal φ1B is set to "H" level and "L" level in synchronization with carrier signal CA1, and in the period during which the level of sine-wave command value signal CM is negative, PWM signal φ1B is fixed to "H" level.

The level of sine-wave command value signal CM is compared with the level of negative-side triangular wave carrier signal CA2. When the level of sine-wave command value signal CM is higher than the level of negative-side triangular wave carrier signal CA2, PWM signal φ1A is set to "H" level. When the level of sine-wave command value signal CM is lower than the level of negative-side triangular wave carrier signal CA2, PWM signal φ1A is set to "L" level.

Therefore, in the period during which the level of sine-wave command value signal CM is positive, PWM signal φ1A is set to "H" level. In the period during which the level of sine-wave command value signal CM is negative, PWM signal φ1A is set to "H" level and "L" level in synchronization with carrier signal CA2. PWM signal φ1 is the AND signal of PWM signals φ1A, φ1B. PWM signal φ1 is set to "H" level and "L" level in synchronization with carrier signals CA1, CA2.

The ratio between the time during which PWM signal is set to "H" level in one cycle and the time of one cycle of PWM signal is called duty ratio. In the period during which the level of sine-wave command value signal CM is positive, the duty ratio of PWM signal φ1 is smallest in the vicinity of the positive peak (90 degrees) of sine-wave command value signal CM, increases farther from the peak, and is largest in the vicinity of 0 degree and is the vicinity of 180 degrees. In the period during which the level of sine-wave command value signal CM is negative, the duty ratio of PWM signal φ1 is smallest k the vicinity of the negative peak (270 degrees) of sine-wave command value signal CM, increases farther from the peak, and is smallest in the vicinity of 180 degrees and in the vicinity of 360 degrees.

Current flowing through each of diodes D1 to D6 and transistor Q1 during operation of the converter will now be described. It is assumed that the power factor is 1.0, and sine-wave command value signal CM and AC voltage VAC match in phase. In the period during which the level of sine-wave command value signal CM is positive, when transistor Q1 is turned off, current I1 at a level in accordance with the level of AC voltage VAC flows from input terminal T0 through diode D1 to output terminal T1, and when transistor Q1 is turned on, current I1A at a level that complements current I1 flows in a path from input terminal T0 through diode D3, transistor Q1, and diode D6 to output terminal T3.

In this period, the effective value of current flowing through diode D1 is largest among diodes D1 to D6 and transistor Q1, and switching loss occurs in transistor Q1.

Every time transistor Q1 changes from the off state to the on state, reverse bias voltage is applied to diode D1, and diode D1 performs reverse recovery operation. In this period, no current flows through diodes D2, D4, D5.

In the period during which the level of sine-wave command value signal CM is negative, when transistor Q1 is turned off current I2 at a level in accordance with the level of AC voltage VAC flows from output terminal T2 through diode D2 to input terminal T0, and when transistor Q1 is turned on, current I2A at a level that complements current I2 flows in the path from output terminal T3 through diode D4, transistor Q1, and diode D5 to input terminal T0.

In this period, the effective value of current flowing through diode D2 is largest among diodes D1 to D6 and transistor Q1, and switching loss occurs in transistor Q1. Every time transistor Q1 changes from the off state to the on state, reverse bias voltage is applied to diode D2, and diode D2 performs reverse recovery operation. In this period, no current flows through diodes D1, D3, D6.

In summary, large current, flows through diodes D1, D2, and diodes D1, D2 perform reverse recovery operation. Current smaller than the one in diodes D1, D2 flows through diodes D3 to D6, and diodes D3 to D6 do not perform reverse recovery operation. Current flows through transistor Q1, and switching loss occurs in transistor Q1.

Thus, as described above, diodes D1, D2 are formed of SIC which is a wide-bandgap semiconductor, and Schottky barrier diodes with rated current of a large value (for example, 600 A) are employed, thereby reducing the recovery loss during reverse recovery operation. Diodes D3 to D6 are formed of Si which is a semiconductor other than wide-bandgap semiconductors, and diodes with rated current of a small value (for example, 450 A) are employed, thereby reducing the costs.

Furthermore, transistor Q1 is formed of SiC which is a wide-bandgap semiconductor, and an n-channel MOS transistor with rated current of a large value (for example, 500 A) is employed, thereby reducing switching loss.

FIG. 3(a) is a time chart showing switching operation of an n-channel MOS transistor (referred to as Si transistor) formed of Si, and FIG. 3(b) is a time chart showing switching operation of an n-channel MOS transistor (referred to as SiC transistor) formed of SiC.

In FIGS. 3(a)(b), it is assumed that in the initial state, the gate signal (not shown) is set to "H" level to turn on the transistor, constant current I flows through the transistor, and drain-source voltage Vds is 0 V. When the gate signal is lowered from "H" level to "L" level to turn oil the transistor at a certain time, current I decreases and voltage Vds increases.

As can be understood from FIGS. 3(a)(b), time Ta taken for current I to start dropping to reach 0 A in the Si transistor is longer than time Tb taken for current I to start dropping to reach 0 A in the SiC transistor. In the Si transistor, current I is reduced quickly up to a certain value but it takes time to reach 0 A from the certain value. Current that flows from a certain value up to 0 A is called tail current.

By contrast, in the SiC transistor, current I decreases quickly and a slight overshoot occurs. The switching loss of the transistor is the product of current I and voltage Vds and corresponds to the area of the hatched section in the figure. Therefore, the switching loss of the SiC transistor is smaller than the switching loss of the Si transistor.

FIG. 4 is a diagram showing the appearance of the converter shown in FIG. 1. In FIG. 4, the converter includes one semiconductor module M1. In the inside of semiconductor module M1, diodes D1 to D4 and transistor Q1 are provided. On the outside of semiconductor module M1, input terminal T0 and output terminals T1 to T3 are provided. Furthermore, on the outside of semiconductor module M1, a signal terminal for applying PWM signal φ1 to the gate of transistor Q1 is provided, though not shewn in the figure for simplicity of the figure.

Figure 5:
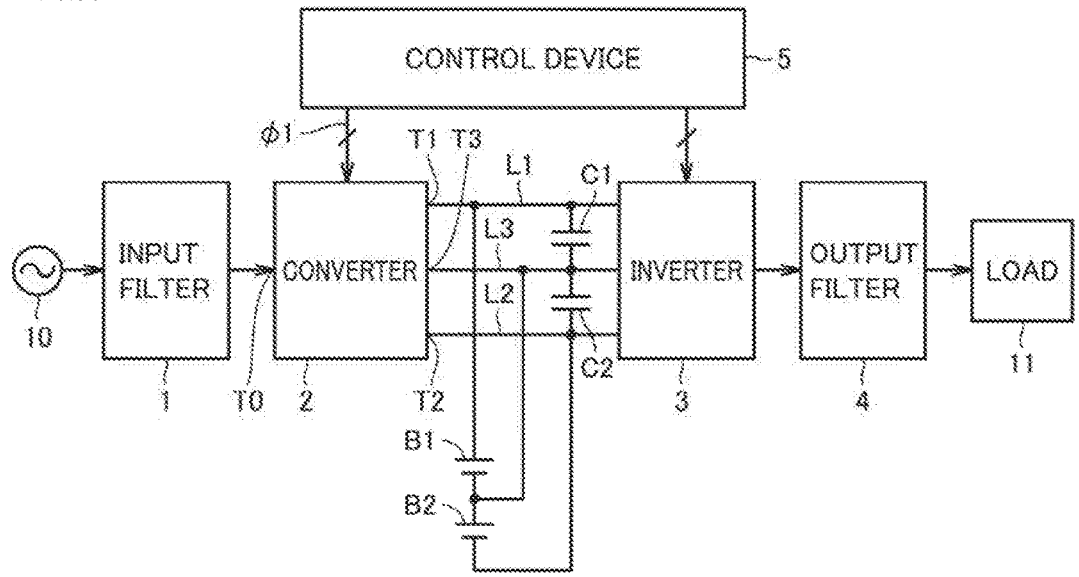
FIG. 5 is a circuit block, diagram showing the configuration of an uninterruptible power supply device including the converter shown in FIG. 3.

FIG. 5 is a circuit block diagram showing the configuration of an uninterruptible power supply device including the converter shown in FIG. 1. In FIG. 5, the uninterruptible power supply device Includes an input filter 1, a converter 2, a DC positive bus L1, a DC negative bus L2, a DC neutral point bus L3, capacitors C1, C2, an inverter 3, an output filter 4, a bidirectional chopper 5, and a control device 6.

Input filter 1 is a low pass filter and allows AC power of a commercial frequency from a commercial AC power source 10 so pass through input terminal T0 of converter 2 and prevents the signal of a carrier frequency produced in converter 2 from passing toward commercial AC power source 10.

DC positive bus L1, DC negative bus L2, and DC neutral point bus L3 have their one ends connected to output terminals T1, T2, T3 of converter 2, respectively, and their other ends connected to three input terminals of inverter 3, respectively. Capacitor C1 is connected between buses L1 and L3, and capacitor C2 is connected between buses L3 and L2. Buses L1, L3 axe connected to the positive electrode and the negative electrode of battery B1, respectively, and buses L3, L2 are connected to the positive electrode and the negative electrode of battery B2, respectively.

As shown in FIG. 1, converter 2 includes input terminal T0, output terminals T1 to T3, diodes D1 to D6, and transistor Q1 and is controlled by PWM signal φ1 from control device 5.

During normal operation in which AC power is supplied normally from commercial AC power source 10, converter 2 converts AC power supplied from commercial AC power source 10 through input filter 1 into DC power and supplies the DC power to each of batteries B1, B2 and also to inverter 3. Each of batteries B1, B2 stores DC power.

In other words, converter 2 is controlled by PWM signal φ1 applied from control device 5, generates DC voltages V1 to V3 based on AC voltage VAC supplied from commercial AC power source 10 through input filter 1, and applies the generated DC voltages V1 to V3 to DC positive bus L1, DC negative bus L2, and DC neutral point bus L3, respectively. If output terminal 13 is grounded, DC voltages V1 to V3 are to be positive voltage, negative voltage, and 0 V, respectively. DC voltages V1 to V3 are smoothed by capacitors C1, C2 DC voltages V1 to V3 are supplied to batteries B1, B2 and inverter 3. During a power failure in which the supply of AC power from commercial AC power source 10 is stopped, transistor Q1 is fixed to the state and the operation of converter 2 is stopped.

During normal operation in which AC power is supplied normally from commercial AC power source 10, inverter 3 converts DC power generated in converter 2 into AC power. During a power failure in which the supply of AC power from commercial AC power source 10 is stopped, inverter 3 converts DC power of batteries B1, B2 into AC power.

In other words, inverter 3 generates AC voltage in three levels based on DC voltages V1 to V3 supplied from converter 2 through buses L1 to L3 during normal operation and generates AC voltage in three levels based on DC voltages V1 to V3 supplied from batteries B1, B2 through buses L1 to L3 during a power failure.

Output, filter 4 is connected between the output terminal of inverter 3 and load 11. Output filter 4 is a low pass filter and allows AC power of a commercial frequency, of AC power output from inverter 3, to pass through load 11 and prevents the signal of a carrier frequency generated in inverter 3 from passing toward load 11. In other words, output filter 4 converts the output, voltage of inverter 3 into a sine wave of a commercial frequency to be supplied to load 11.

Control device 5 controls converter 2 and inverter 3 by supplying FWM signal while monitoring AC voltage from commercial AC power source 10, AC voltage output to load 11, DC voltages V1 to V3, and the like, The operation of this uninterruptible power supply device will now be described. During normal operation in which AC power is supplied normally from commercial AC power source 10, AC power from commercial AC power source 10 is supplied to converter 2 through input filter 1 and converted into DC power by converter 2. The DC power generated by converter 2 is stored into batteries B1, B2 and also supplied to inverter 3 and converted by inverter 3 into AC power of a commercial frequency. The AC power generated by inverter 3 is supplied to load 11 through output filter 4 to bring load 11 into operation.

During a power failure in which the supply of AC power from commercial AC power source 10 is stopped, the operation of converter 2 is stopped, and DC power of batteries B1, B2 is supplied to inverter 3 and converted into AC power of a commercial frequency by inverter 3. The AC power generated by inverter 3 is supplied to load 11 through output filter 4 to keep load 11 operating.

Therefore, even when a power failure occurs, the operation of load 11 continues as long as DC power is stored in batteries B1, B2. When the supply of AC power from commercial AC power source 10 is resumed, the operation of converter 2 is resumed, and the DC power generated, in converter 2 is supplied to batteries B1, B2 and inverter 3 to restore the original state.

As described above, in the present first embodiment, since a converter is constituted with one transistor Q1 and sis diodes D1 to D6, it is possible to reduce the number of semiconductor devices compared with the conventional one to achieve size reduction and lower costs of the device. Moreover, since diodes D1, D2 performing reverse recovery operation and transistor Q1 switching current are formed of a wide-bandgap semiconductor, recovery loss and switching loss can be reduced, In addition, since diodes D3 to D6 that do not perform reverse recovery operation are formed of a semiconductor other than wide-bandgap semiconductors, lower costs can be achieved.

Although SiC is used as a wide-bandgap semiconductor in the present first embodiment, the present invention is not limited thereto and any other semiconductor can be used as long as it is a wide-bandgap semiconductor, for example, GaN (gallium nitride) may be used as a wide-bandgap semiconductor.

Second Embodiment

Figure 6:
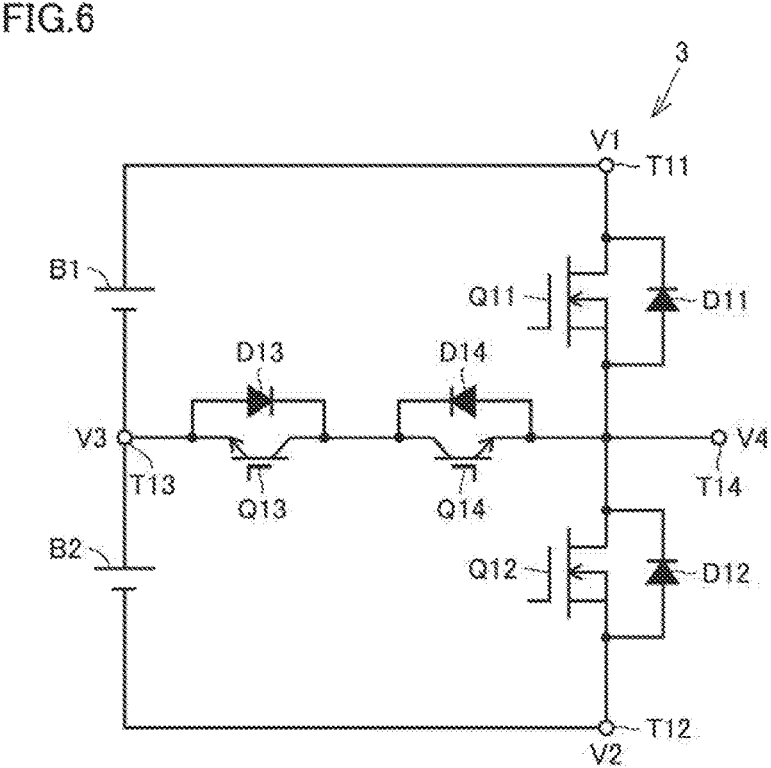
FIG. 6 is a circuit diagram showing the configuration of an inverter included in an uninterruptible power supply device according to a second embodiment of the present invention.

FIG. 6 is a circuit block, diagram showing the configuration of inverter 3 included in an uninterruptible power supply device according to a second embodiment of the present invention. The overall configuration of the uninterruptible power supply device is as shown in FIG. 5. Converter 2 included in the uninterruptible power supply device is the converter shown in FIG. 1. In FIG. 6, this inverter 3 includes input terminals T11 to T13 (first to third output terminals), an output terminal T14 (first to third output terminals), transistors Q11 to Q14 (second to fifth transistors), and diodes D11 to D14 (seventh to tenth diodes).

Input terminals T11 to T13 are connected to DC positive bus L1, DC negative bus L2 and DC neutral point bus L3 in FIG. 5, respectively. Input terminals T11, T13 are connected with the positive electrode and the negative electrode of battery B1, respectively. Input terminals T13, T12 are connected with the positive electrode and the negative electrode of battery B2, respectively. Each of batteries B1, B2 outputs DC voltage. The output voltage of battery B1 is equal to the output voltage of battery B2. Therefore, DC voltages V1, V2, V3 are applied to input terminals T11, T12, T13, respectively, where V1>V3>V2, which can be written into V3=(V1+V2)/2. This inverter is to convert DC voltages V1 to V3 applied to input terminals T11 to T13 into AC voltage V4 in three levels to be output to output terminal T14. If input terminal T13 is grounded, DC voltages V1 to V3 are to be positive voltage, negative voltage, and 0 V, respectively.

Each of transistors Q11, Q12 is an n-channel MOS transistor formed of SiC (silicon carbide) which is a wide-bandgap semiconductor. The rated current of each of transistors Q11, Q12 is for example, 600 A and larger than the rated current of each of transistors Q13, Q14 and diodes D11 to D14.

Each of transistors Q13, Q14 is an IGBT (insulated Gate Bipolar Transistor) formed of Si (silicon) which is a semiconductor other than wide-bandgap semiconductors. The rated current of each of transistors Q13, Q14 is, for example, 450 A.

Each of diodes D11, D12 is formed of Si (silicon) which is a semiconductor other than wide-bandgap semiconductors. The rated current of each of diodes D11, D12 is, for example, 300 A.

Each of diodes D13, D14 is a Schottky barrier diode formed of SiC (silicon carbide) which is a wide-bandgap semiconductor. The rated current of each of diodes D13, D14 is, for example, 500 A. The rated current of transistors Q11, Q12 is larger than the rated current of each of transistors Q13, Q14 and diodes D11 to D14.

The reason why the specifications of transistors Q11, Q12 differ from the specifications of transistors Q13, Q14 and the specifications of diodes D11, D12 differ from the specifications of diodes D13, D14 will be described later.

Transistor Q11 has its drain (first electrode) connected to input terminal T11 (first output terminal) and its source (second electrode) connected to output terminal T14 (fourth output terminal). Diode D11 has its anode connected to output terminal T14 and its cathode connected to input terminal T11.

Transistor Q12 has its drain connected to output terminal T14 and its source connected to input terminal T12 (second output terminal). Diode D6 has its anode connected to input terminal T12 and its cathode connected to output terminal T14. That is, diodes D11, D12 are connected in anti-parallel with transistors Q11, Q12, respectively.

Transistors Q13, Q14 have their collectors (first electrodes) connected to each other, and transistors Q13, Q14 have their emitters (second electrodes) connected to input terminal T13 (third output, terminal) and output terminal T14, respectively. Diodes D13, D14 have their cathodes connected together to the collectors of transistors Q13, Q14 and their anodes connected to input terminal T13 and output terminal T14, respectively. That is, diodes D13, D14 are connected in anti-parallel with transistors Q13, Q14, respectively. Transistors Q13, Q14 and diodes D13, D14 constitute a second bidirectional switch connected between input terminal T13 and output terminal T14.

Figure 7:
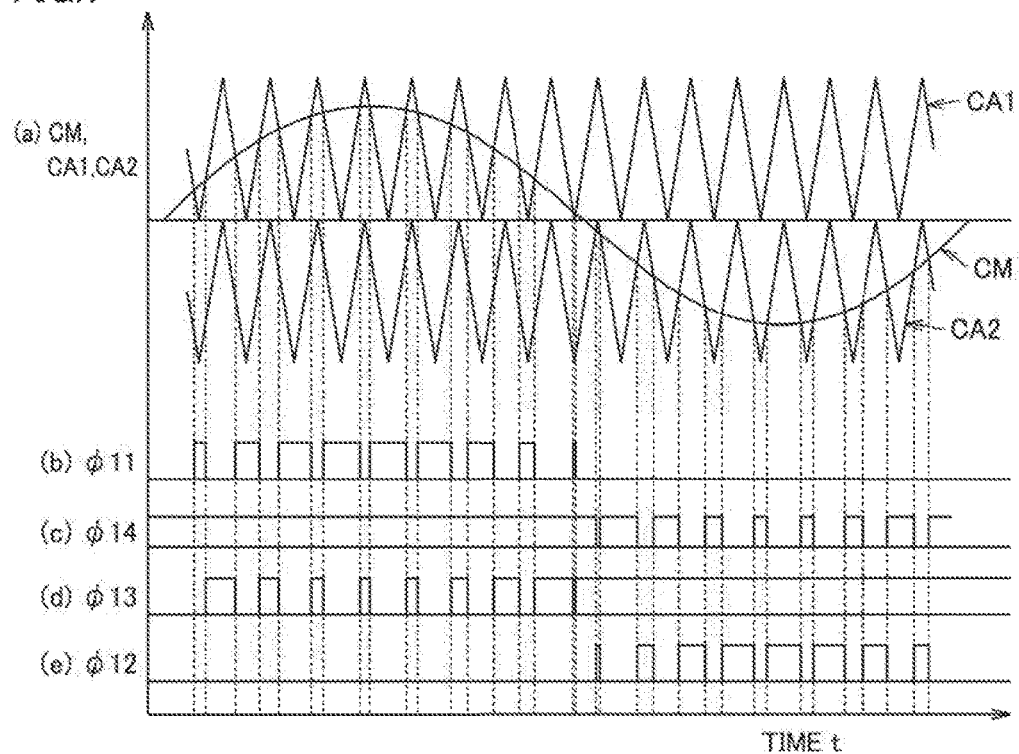
FIG. 7 is a time chart showing the waveforms of four PWM signals tor controlling tour transistors shown in FIG. 6.

The operation of this inverter will now be described. PWM signals φ11 to φ14 are applied from control device 5 to the gates of transistors Q11 to Q14, respectively. FIGS. 7(a) to (e) are diagrams showing the generation method and the waveforms of PWM signals φ1 to φ14. In particular, FIG. 7(a) shows the waveforms of sine-wave command value signal CM, positive-side triangular wave carrier signal CA1, and negative-side triangular wave carrier signal CA2, and FIGS. 7(b) to (e) show the waveforms of PWM signals φ11, φ14, φ13, φ12, respectively.

In FIGS. 7(a) to (e), the frequency of sine-wave command value signal CM is, for example, a commercial frequency. Carrier signals CA1, CA2 have the same cycle and phase. The cycle of carrier signals CA1, CA2 is sufficiently smaller than the cycle of sine-wave command value signal CM.

The level of sine-wave command value signal CM is compared with the level of positive-side triangular wave carrier signal CA1. When the level of sine-wave command value signal CM is higher than the level of positive-side triangular wave carrier signal CAT, PWM signals φ11, φ13 are set to "H" level and "L" level, respectively. When the level of sine-wave command value signal CM is lower than the level of positive-side triangular wave carrier signal CA1, PWM signals φ11, φ13 are set to "L" level, and "H" level, respectively.

Therefore, in the period during which the level of sine-wave command value signal CM is positive, PWM signals φ11 and φ3 are alternately set to "H" level in synchronization with carrier signal CA1, and transistors Q11 and Q13 are alternately turned on. In the period during which the level of sine-wave command value signal CM is negative, PWM signals φ11, φ3 are fixed to "L" level and "H" level, respectively, transistor Q11 is fixed to the off state, and transistor Q13 is fixed to the on state.

The level of sine-wave command value signal CM is compared with the level of negative-side triangular wave carrier signal CA2. When the level of sine-wave command value signal CM is higher than the level of negative-side triangular wave carrier signal CA2, PWM signals φ12, φ4 are set to "L" level and "H" level, respectively. When the level of sine-wave command value signal CM is lower than the level of negative-side triangular wave carrier signal CA2, PWM signals φ12, φ14 are set to "H" level and "L" level, respectively.

Therefore, in the period during which the level of sine-wave command value signal CM is positive, PWM signals φ12, φ14 are fixed to "L" level and "H" level, respectively, transistor Q12 is fixed to the off state, and transistor Q14 is fixed to the on state. In the period during which the level of sine-wave command value signal CM is negative, PWM signals φ12 and φ14 are alternately set to "H" level, in synchronization with carrier signal CA2, and transistors Q12 and Q14 are alternately turned on.

The ratio between the time during which PWM signal is set to "H" level in one cycle and the time of one cycle of FWM signal is called duty ratio. In the period during which the level of sine-wave command value signal CM is positive, the duty ratio of FWM signal φ11 is largest in the vicinity of positive peak (90 degrees) of sine-wave command value signal CM, decreases farther from the peak, and is zero in the vicinity of 0 degree and in the vicinity of 180 degrees. In the period during which the level of sine-wave command value signal CM is negative, the duty ratio of PWM signal φ11 is fixed to zero. PWM signal φ13 is a complementary signal to PWM signal φ11.

The duty ratio of PWM signal φ12 is fixed to zero in the period during which the level of sine-wave command value signal CM is positive. The duty ratio of PWM signal φ12 is largest in the vicinity of the negative peak (270 degrees) of sine-wave command value signal CM, decreases farther from the peak, and is zero in the vicinity of 180 degrees and in the vicinity of 360 degrees. The duty ratio of PWM signal φ12 is fixed to zero in the period during which the level of sine-wave command value signal CM is positive. PWM signal φ14 is a complementary signal to PWM signal φ12.

Figure 8:
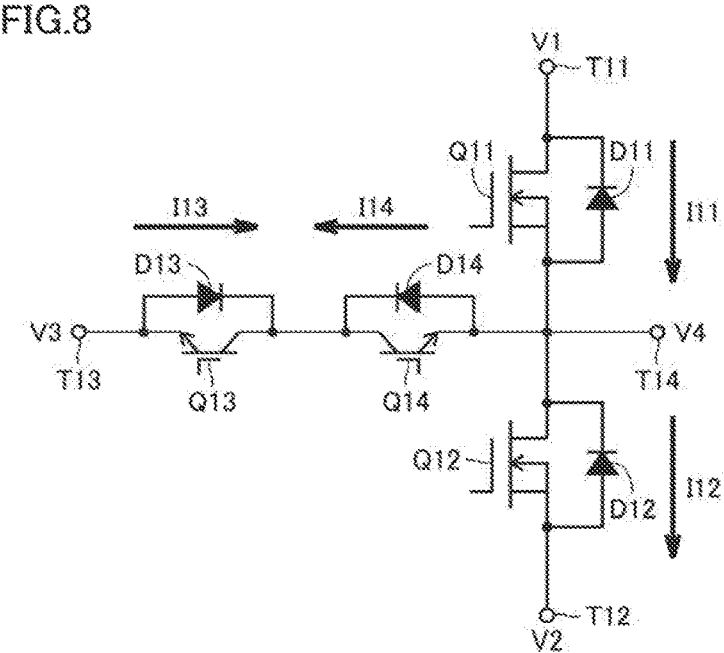
FIG. 8 is a circuit diagram for explaining current flowing through the inverter shown in FIG. 6.

Next, current flowing through each of transistors Q11 to Q14 and diodes D11 to D14 during operation of the inverter will be described. As shown in FIG. 8, current flowing from input terminal T11 to output terminal T14 is denoted as I11, current flowing from output terminal T14 to input terminal T12 is denoted as I12, current flowing from input terminal T13 to output terminal T14 is denoted as I13, and current flowing from output terminal T14 to input terminal T13 is denoted as I14.

Figure 9:
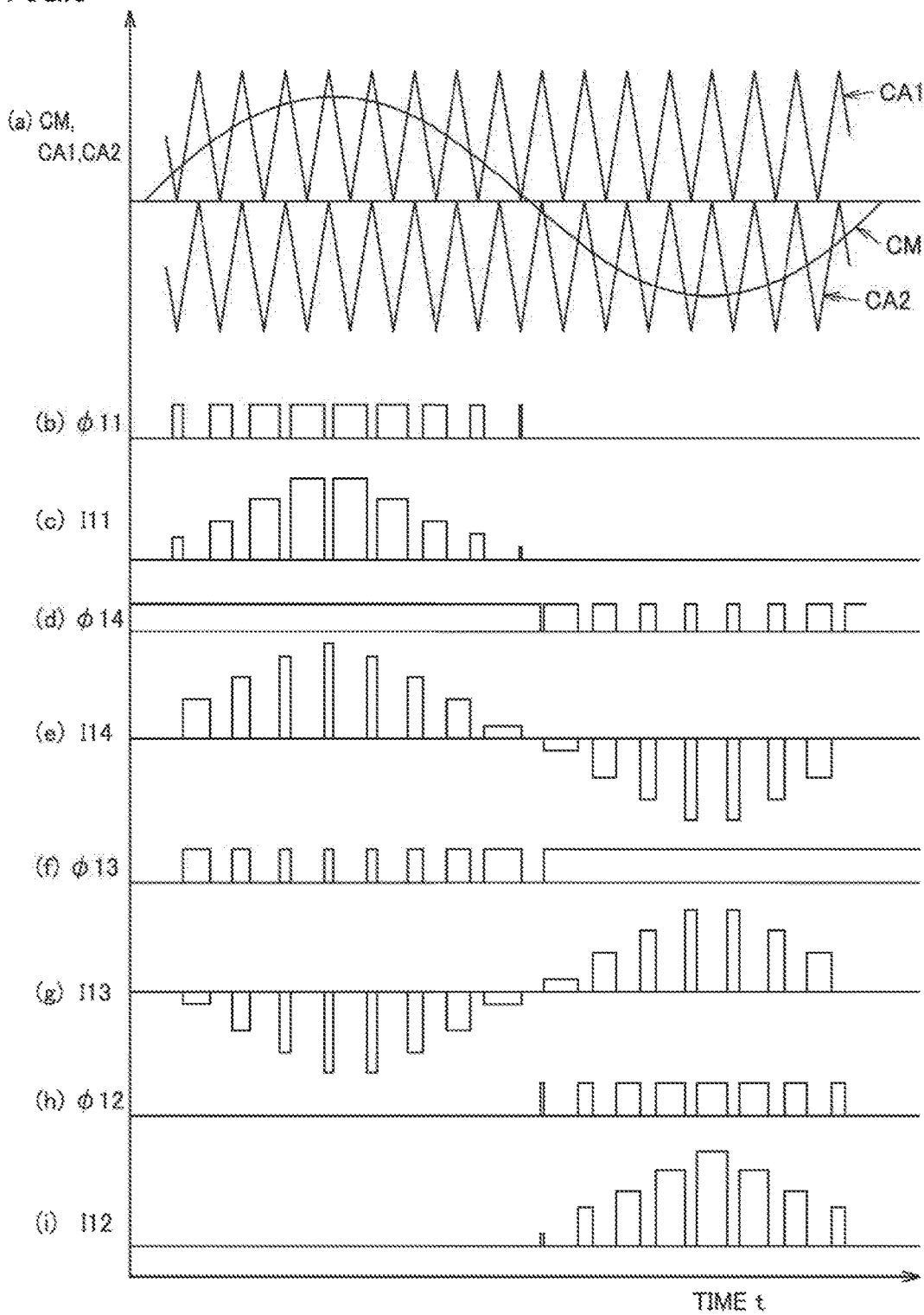
FIG. 9 is a time chart showing current flowing through the inverter shown in FIG. 6.

FIGS. 9(a) to (i) are time charts showing the operation of the inverter. In particular. FIG. 9(a) shows the waveforms of sine-wave command value signal CM, positive-side triangular wave carrier signal CA1, and negative-side triangular wave carrier signal CA2, FIGS. 9(b)(d)(f)(h) are the waveforms of PWM signals φ11, φ14, φ13, φ12, respectively, and FIGS. 9(c)(e)(g)(i) show the waveforms of currents I11, I14, I13, I12, respectively. Of currents I11 to I14, the positive current shows current flowing through transistor Q, and the negative current shows current flowing through diode D. The case where the power factor is 1.0 is shown.

In FIGS. 9(a) to (i), in the period during which the level of sine-wave command value signal CM is positive, PWM signals φ14, φ12 are fixed to "H" level and "L" level, respectively, and PWM signals φ11 and φ13 are alternately set to "H" level. Therefore, transistors Q14, Q12 are fixed to the on state and the off state, respectively, transistors Q11 and Q13 are alternately turned on, and DC voltages V1 and V3 alternately appear at output terminal T14.

In this period, when transistor Q11 is turned on, current I11 at a level in accordance with the on time of transistor Q11 flows, and when transistor Q11 is turned off, current I13 at a level that complements current I11 flows in the path of diode D13 and transistor Q14.

Since transistor Q12 is fixed to the off state, no current flows through transistor Q12, and switching loss does not occur in transistor Q12. Although transistor Q13 is turned on/off current flows through diode D13, and no current flows through transistor Q13. Then, switching loss does not occur in transistor Q13. Since transistor Q14 is fixed to the on state, current flows through transistor Q14 but switching loss does not occur in transistor Q14. Therefore, in this period, the effective value of current flowing through transistor Q11 is largest among transistors Q11 to Q14, and switching loss in transistor Q11 is largest.

Every time transistor Q11 changes from the off state to the on state, reverse bias voltage is applied to diode D13, and diode D13 performs reverse recovery operation. In this period, no current flows in other diodes D11, D12, D14.

In the period during which the level of sine-wave command value signal CM is negative, PWM signals φ13, φ11 are fixed to "H" level and "L" level, respectively, and PWM signals φ12 and φ14 are alternately set to "H" level. Therefore, transistors Q13, Q11 are fixed to the on state and the off state, respectively, transistors Q12 and Q14 are alternately turned on, and DC voltages V2 and V3 alternately appear at output terminal T14.

In this period, when transistor Q12 is turned on, current I12 at a level in accordance with the on time of transistor Q12 flows, and when transistor Q12 is turned off, current I13 flows in the path of diode D14 and transistor Q13.

Since transistor Q11 is fixed to the off state, no current flows through transistor Q11, and switching loss does not occur in transistor Q11. Although transistor Q14 is turned on/off current flows through diode D12, and no current flows through transistor Q14. Then, switching loss does not occur in transistor Q14. Since transistor Q13 is fixed to the on state, current flows through transistor Q13, but switching loss does not occur in transistor Q13. Therefore, in this period, the effective value of current flowing through transistor Q12 is largest among transistors Q11 to Q14, and the switching loss in transistor Q12 is largest.

Furthermore, every time transistor Q12 changes from the off state to the on state, reverse bias voltage is applied to diode D14, and diode D14 performs reverse recovery operation. In this period, no current flows in other diodes D11, D12, D13.

In summary, large current flows through transistors Q11, Q12, and switching loss occurs in transistors Q11, Q12. Current smaller than in transistors Q11, Q12 flows through transistors Q13, Q14, and switching loss does not occur in transistors Q13, Q14.

Thus, as described above, transistors Q11, Q12 are formed of SiC which is a wide-bandgap semiconductor, and n-channel MOS transistors with rated current of a large value (for example, 600 A) are employed, thereby reducing switching loss. Furthermore, transistors Q13, Q14 are formed of Si which is a semiconductor other than wide-bandgap semiconductors, and IGBTs with rated current of a small value (for example, 450 A) are employed, thereby achieving lower costs.

Current equivalent to that of transistors Q13, Q14 flows through diodes D13, D14, and diodes D13, D14 perform reverse recovery operation No current flows through diodes D11, D12. It is noted that diodes D11, D12 are provided to protect transistors Q11, Q12 from voltage produced in an inductor when the inductor is used as a load.

Thus, as described above, diodes D13, D14 are formed of SiC which is a wide-bandgap semiconductor, and Schottky barrier diodes with rated current having a value (for example, 500 A) equivalent to that of transistors Q13, Q14 are employed, thereby reducing recovery loss during reverse recovery operation. Diodes D11, D12 are formed of Si which is a semiconductor other than wide-bandgap semiconductors, and diodes with rated current having a small value (for example, 300 A) are employed, thereby achieving lower costs.

Figure 10:
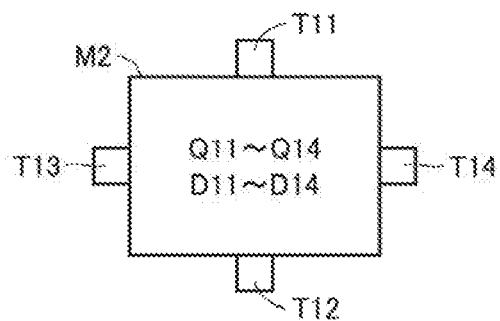
FIG. 10 is a block diagram showing the configuration of the semiconductor module included m the inverter shown in FIG. 6.

FIG. 10 is a diagram showing the appearance of inverter 3 shown in FIG. 6. In FIG. 10, inverter 3 includes one semiconductor module M2. In the inside of semiconductor module M2, transistors Q11 to Q14 and diodes D11 to D14 are provided. On the outside of semiconductor module M2, input terminals T11 to T13 and output terminal T14 are provided. Furthermore, on the outside of semiconductor module M2, four signal terminals for applying PWM signals φ1 to φ14 to the gates of transistors Q11 to Q14 are provided, though the four signal terminals are not shown in the figure for simplicity of the figure.

As described above, in the present, second embodiment, since n-channel MOS transistors formed of a wide-bandgap semiconductor are used as transistors Q11, Q12 that turn on/off current, and IGBTs formed of a semiconductor other than wide-bandgap semiconductors are used as transistors QB13, Q14 that do not turn on/off current, reduction of switching loss and lower costs can be achieved.

Furthermore, since Schottky barrier diodes formed of a wide-bandgap semiconductor are used as diodes D13, D14 that perform reverse recovery operation and diodes formed of a semiconductor other than wide-bandgap semiconductors are used as diodes D11, D12 that do not perform reverse recovery operation, reduction of recovery loss and lower costs can be achieved.

Although SiC is used as a wide-bandgap semiconductor in the present second embodiment, the present invention is not limited thereto and any semiconductor can be used as long as it is a wide-bandgap semiconductor. For example, GaN (gallium nitride) may be used as a wide-bandgap semiconductor.

Third Embodiment

Figure 11:
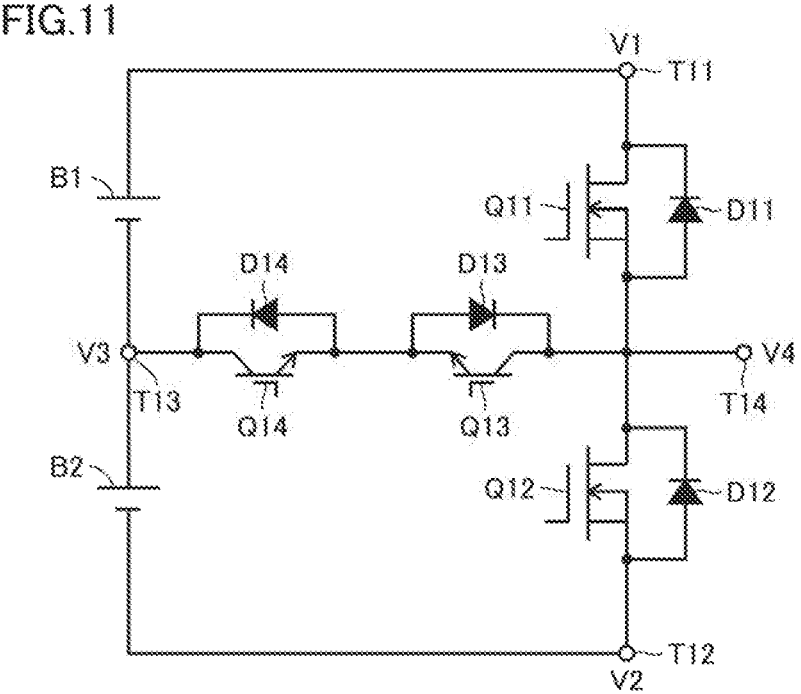
FIG. 11 is a circuit diagram showing the configuration of an inverter according to a third embodiment of the present invention.

FIG. 11 is a circuit diagram showing a configuration of an inverter according to a third embodiment of the present invention, in comparison with FIG. 6. Referring to FIG. 11, this inverter differs from inverter 3 in FIG. 6 in that the parallel connection structure of transistor Q13 and diode D13 and the parallel connection structure of transistor Q14 and diode D14 are replaced.

Transistors Q13, Q14 have their emitters connected to each other and their collectors connected to input terminal T13 and output terminal T14, respectively. Transistors Q11 to Q14 are controlled by PWM signals φ1 to φ14, respectively. When DC voltages V1, V3 are alternately output to output terminal T14, transistor Q14 is turned on, and transistors Q11, Q13 are alternately turned on. When DC voltages V2, V3 are alternately output to output terminal T14, transistor Q13 is turned on and transistors Q12, Q14 are alternately turned on.

Other configuration and operation are the same as in the second embodiment and a description thereof will not be repeated. The present third embodiment also achieves the same effects as the second embodiment.

Fourth Embodiment

Figure 12:
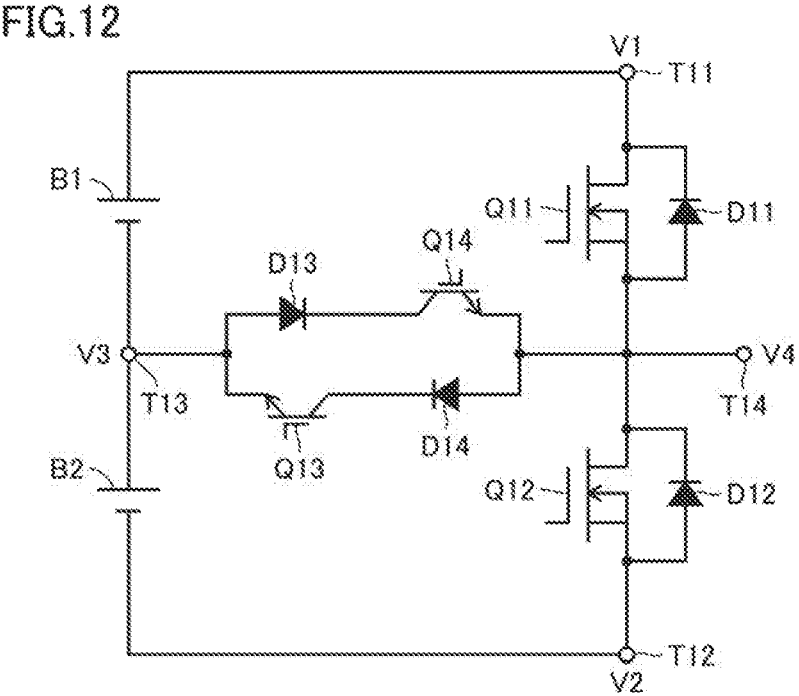
FIG. 12 is a circuit diagram showing the configuration of an inverter according to a fourth embodiment of the present invention.

FIG. 12 is a circuit diagram showing a configuration of an inverter according to a fourth embodiment of the present invention, in contrast with FIG. 6. Referring to FIG. 12, this inverter differs from inverter 3 in FIG. 6 in that the collectors of transistors Q13, Q14 are separated from the cathodes of diodes D13, D14, the collector of transistor Q13 is connected to the cathode of diode D14, and the collector of transistor Q14 is connected to the cathode of diode D13.

Transistors Q11 to Q14 are controlled by PWM signals φ11 to φ14, respectively. When DC voltages V1, V3 are alternately output to output terminal T14, transistor Q14 is turned on and transistors Q11, Q13 are alternately turned on. When DC voltages V2, V3 are alternately output to output terminal T14, transistor Q13 is turned on and transistors Q12, Q14 are alternately turned on.

Other configuration and operation are the same as in the second embodiment and a description thereof will not be repeated. The present fourth embodiment also achieves the same effects as the second embodiment.

Fifth Embodiment

Figure 13:
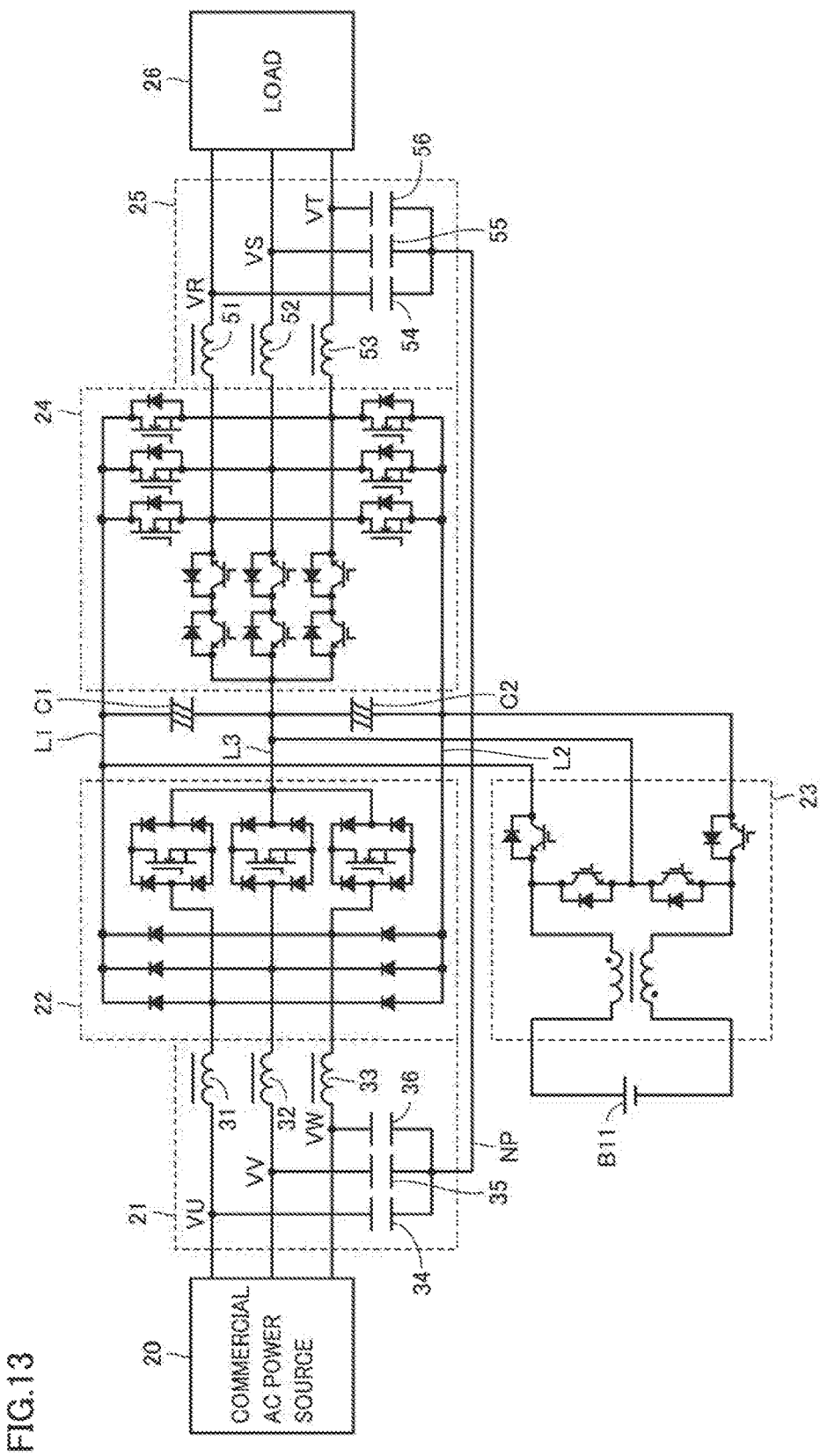
FIG. 13 is a circuit block diagram showing the configuration of an uninterruptible power supply device according to a fifth embodiment of the present invention.
Figure 14:
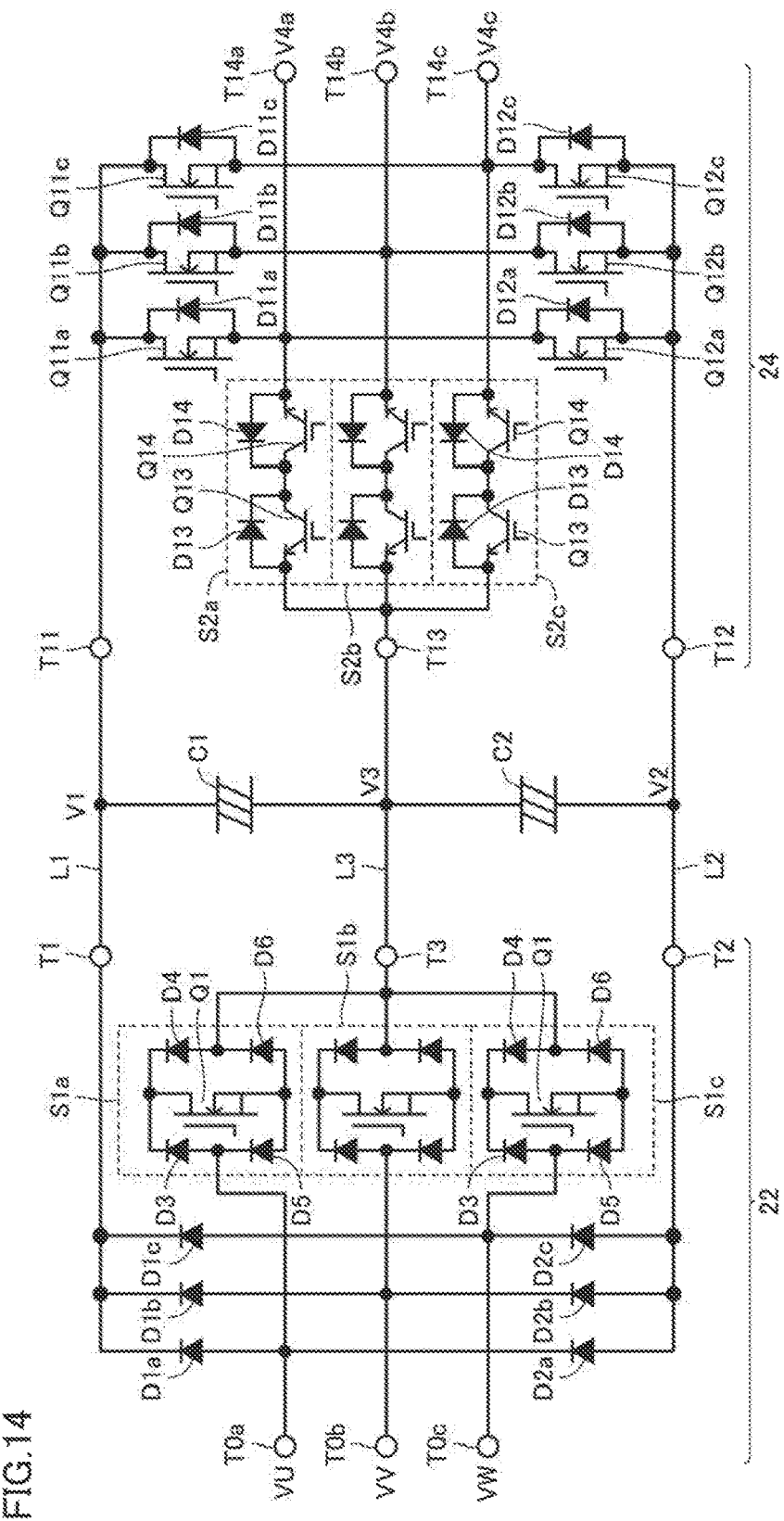
FIG. 14 is a circuit diagram showing the configuration of the converter and the inverter shown in FIG. 13.
Figure 15:
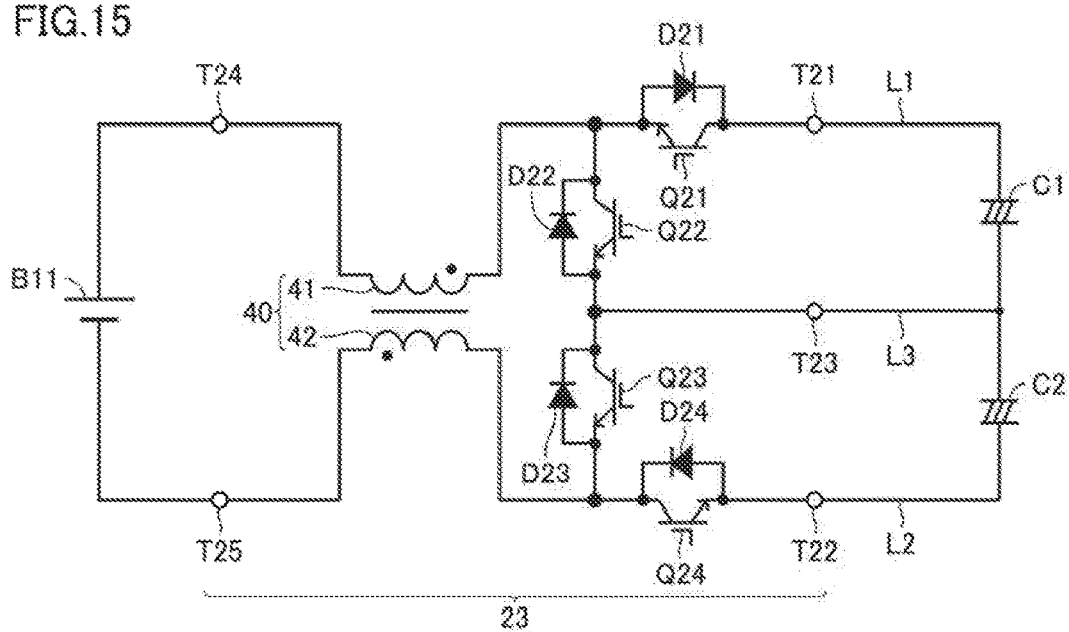
FIG. 15 is a circuit diagram showing the configuration of the bidirectional chopper shown in FIG. 13.

FIG. 13 is a circuit block diagram showing the configuration of an uninterruptible power supply device according to a fifth embodiment of the present invention. FIG. 14 is a.

circuit diagram showing the configuration of converter 22 and inverter 24 shown in FIG. 13. FIG. 15 is a circuit diagram showing the configuration of bidirectional chopper 23 shown in FIG. 13. In FIG. 13 to FIG. 15, the uninterruptible power supply device includes an input filter 21, a converter 22, a DC positive bus L1, a DC negative bus L2, a DC neutral point bus L3, capacitors C1, C2, a bidirectional chopper 23, an inverter 24, and an output filter 25. For simplicity of the figure, the control device controlling converter 22, bidirectional chopper 23, and inverter 24 is not shown.

Input filter 21 includes reactors 31 to 33 and capacitors 34 to 36. Reactors 31 to 33 have their one terminals receiving three-phase AC voltages VU, VV, VW, respectively, from commercial AC power source 20 have their other terminals connected to input terminals T0a to T0c of converter 22. Capacitors 34 to 36 have one electrodes connected to one terminals of reactors 31 to 33, respectively; and their other electrodes connected together to a neutral point NP. Reactors 31 to 33 and capacitors 34 to 36 constitute a low pass filter. Input filter 21 allows three-phase AC power of a commercial frequency from commercial AC power source 20 to pass through converter 22 and prevents a signal of a carrier frequency produced in converter 22 from passing toward commercial AC power source 20.

DC positive bus L1, DC negative bus L2, and DC neutral point bus L3 have their one ends connected to output terminals T1, T2, T3 of converter 22, respectively, and their other ends connected to input terminals T11, T12, T13 of inverter 24, respectively. Capacitor C1 is connected between buses L1 and L3, and capacitor C2 is connected between buses L3 and L2. Buses L1 to L3 are connected to battery B11 through bidirectional chopper 23.

As shown in FIG. 14, converter 22 includes input terminals T0a to T0c, output terminals T1 to T3, diodes D1a to D1e, D2a to D2c, and bidirectional switches S1a to S1c. Input terminals T0a to T0c receive three-phase AC voltages VU, VV, VW, respectively, supplied from commercial AC power source 20 through input filter 21. Diodes D1a to D1e have their anodes connected to input terminals T0a to T0c, respectively, and their cathodes connected together to output terminal T1. Diodes D2a to D2c have their anodes connected together to output terminal T2 and their cathodes connected to input terminals T0a to T0c, respectively.

Bidirectional switches S1a to S1c have their one terminals connected to input terminals T0a to T0c, respectively, and their other terminals connected together to output terminal T3. Each of bidirectional switches S1a to S1c includes diodes D3 to D6 and n-channel MOS transistor Q1 as shown in FIG. 1.

The anode of diode D3 and the cathode of diode D5 are connected together to input terminal T0a (or T0b, or T0c). The anode of diode D4 and the cathode of diode D6 are connected together to output terminal T3. The cathodes of diodes D3, D4 are connected to each other, and the anodes of diodes D5, D6 are connected to each other. The drain of transistor Q1 is connected to the cathodes of diodes D3, D4, and the source of transistor Q1 is connected to the anodes of diodes D5, D6.

Transistors Q1 in bidirectional switches S1a to S1c are controlled by PWM signals φ1a, φ1b, φ1c, respectively, from the control device (not shown). The waveforms of FWM signals φ1a, φ1b, φ1c are similar to that of PWM signal φ1 shown in FIG. 2(d). The phases of PWM signals φ1a, φ1b, φ1c are sychronized with the phases of three-phase AC voltages VU, VV, VW, respectively, and shifted from each other by 120 degrees.

That is, input terminal T0a, output terminals T1 to T3, diodes D1a, D2a, and bidirectional switch S1a constitute the converter shown in FIG. 1 to convert AC voltage VU into DC voltages V1 to V3 to be output to output terminals T1 to T3. Input terminal T0b, output terminals T1 to T3, diodes D1b, D2b, and bidirectional switch S1b constitute the converter shown in FIG. 1 to convert AC voltage VV into DC voltages V1 to V3 to be output to output terminals T1 to T3. Input terminal T0c, output terminals T1 to T3, diodes D1c, D2c, and bidirectional switch S1c constitute the converter shown in FIG. 1 to convert AC voltage VW into DC voltages V1 to V3 to be output to output terminals T1 to T3. Converter 22 converts three-phase AC voltages VU, VV, VW into DC voltages V1 to V3 to be output to output terminals T1 to T3.

As described in the first embodiment, diodes D1a to D1e, D2a to D2c and transistors Q1 in bidirectional switches S1a to S1c are formed of a wide-bandgap semiconductor, and diodes D3 to D6 in bidirectional, switches S1a to S1c are formed of a semiconductor other than wide-bandgap semiconductors. The rated current of each of diodes D1a to D1c, D2a to D2c is larger than the rated current of each of diodes D3 to D6 and transistors Q1.

During normal operation in which three-phase AC power is supplied normally from commercial AC power source 20, converter 22 converts three-phase AC power supplied from commercial AC power source 20 through input filter 21 into DC power and supplies the DC power to battery B11 through bidirectional chopper 23 and to inverter 24. Battery B11 stores DC power.

In other words, converter 20 is controlled by PWM signals φ1a, φ1b, φ1c provided from the control device (not shown), generates DC voltages V1 to V3 based on three-phase AC voltages VU, VV, VW supplied from commercial AC power source 20 through input filter 21, mid applies the generated DC voltages V1 to V3 to DC positive bus L1, DC negative bus L2, and DC neutral point bus L3, respectively. If output terminal 13 is grounded, DC voltages V1 to V3 are to be positive voltage, negative voltage, and 0 V. respectively. DC voltages V1 to V3 are smoothed by capacitors C1, C2. DC voltages V1 to V3 are supplied to battery B11 through bidirectional chopper 23 and to inverter 24. During a power failure in which the supply of AC power from, commercial. AC power source 20 is stopped, transistor Q1 is fixed to the off state, and the operation of converter 22 is stopped.

When three-phase AC power is supplied from commercial AC power source 20, bidirectional chopper 23 supplies DC power from capacitors C1, C2 to battery B11, and when the supply of three-phase AC power is stopped from commercial AC power source 20, that is, during a power failure, DC power is supplied from battery B11 to capacitors C1, C2.

That is, as shown in FIG. 15, bidirectional chopper 23 includes terminals T21 to T25, transistors Q21 to Q24, diodes D21 to D24, and a normal mode reactor (DC reactor) 40. Terminals T21 to T23 are connected to DC positive bus L1, DC negative bus L2, and DC neutral point bus L3, respectively. Terminals T24, T25 are connected to the positive electrode and the negative electrode of battery B11, respectively.

Transistors Q21, Q22 are connected in series between terminals T21 and T23, and transistors Q23, Q24 are connected in series between terminals T23 and T22. Diodes D21 to D24 are connected in anti-parallel with transistors Q21 to Q24, respectively. Normal mode reactor 40 includes a coil 41 connected between the node between transistors Q21 and Q22 and terminal T24, and a coil 42 connected between terminal T25 and the node between transistors Q23 and Q24.

Each of transistors Q21 to Q24 is an IGBT formed of Si (silicon) which is a semiconductor other than wide-bandgap semiconductors. Each of diodes D21 to D24 is formed of Si (silicon) which is a semiconductor other than wide-bandgap semiconductors.

When three-phase AC power is supplied from commercial AC power source 20, DC power is supplied from capacitors C1, C2 to battery B11 through bidirectional chopper 23 to charge battery B11. In this case, transistors Q22, Q23 are fixed to the off state, and transistors Q21, Q24 are alternately turned on.

That is, in the first battery charge mode, transistors Q22 to Q24 are turned off and transistor Q21 is turned on. Thus, current flows from terminal T21 through transistor Q21, coil 41, battery B11, coil 42, and diode D23 to terminal T23 to discharge capacitor C1 and charge battery B11.

In the second battery charge mode, transistors Q22, Q23 are turned off, and transistors Q21, Q24 are turned on. Thus, current flows from terminal T21 through transistor Q21, coil 41, battery B11, coil 42, and transistor Q24 to terminal T22 to discharge capacitors C1, C2 and charge battery B11.

In the third battery charge mode, transistors Q21 to Q23 are turned off, and transistor Q24 is turned on. Thus, current flows from terminal T23 through diode D22, coil 41, battery B11, coil 42, and transistor Q24 to terminal T22 to discharge capacitor C2 and charge battery B11.

The first battery charge mode and the third battery charge mode are alternately performed. In the period between the first battery charge mode and the third battery charge mode, electromagnetic energy stored in coils 41, 42 is emitted to allow current to flow in the path of diode D22, coil 41, battery B11, coil 42, and diode D23 to charge battery B11. The second battery charge mode is a mode in which the first battery charge mode and the third battery charge mode overlap.

When the supply of three-phase AC power from commercial AC power source 20 is stopped, DC power is supplied from battery B11 to capacitors C1, C2 through bidirectional chopper 23 to charge capacitors C1, C2. In this case, transistors Q21, Q24 are fixed to the off state, and transistors Q22, Q23 are alternately turned on.

That is, in the first battery discharge mode, transistors Q21, Q23, Q24 are turned off and transistor Q22 is turned on. Thus, current flows from the positive electrode of battery B11 through, coil 41, transistor Q22, capacitor C2, diode D24, and coil 42 to the negative electrode of battery B11 to discharge battery B11 and charge capacitor C2.

In the second battery discharge mode, transistors Q21 to Q24 are turned off. Thus, current flows from the positive electrode of battery B11 through coil 41, diode D21, capacitors C1, C2, diode D24, and coil 42 to the negative electrode of battery B11 to discharge battery B11 and charge capacitors C1, C2.

In the third battery discharge mode, transistors Q21, Q22, Q24 are turned off, and transistor Q23 is turned on. Thus, current flows from the positive electrode of battery B11 through coil 41, diode D21, capacitor C1, transistor Q23, and coil 42 to the negative electrode of battery B11 to discharge battery B11 and charge capacitor C1.

The first battery discharge mode and the third battery discharge mode are alternately performed. In the period between the first battery discharge mode and the third battery discharge mode, when the voltage between terminals T21 and T22 is lower than the voltage at battery B11, the second battery discharge mode is performed.

As shown in FIG. 14, inverter 24 includes input terminals T11 to T13, output. terminals T14a to T14c, transistors Q11a to Q11c, Q12a to Q12c, diodes D11a to D11c, D12a to D12c, and bidirectional switches S2a to S2c. Input terminals T11 to T13 are connected to DC positive bus L1, DC negative bus L2, and DC neutral point bus l3, respectively.

Transistors Q11a to Q11c have their drains connected together to input terminal T11 and their sources connected to output terminals T14a to T14c, respectively. Transistors Q12a to Q12c have their drains connected to output terminals T14a to T14c, respectively, and their sources connected together to input terminal T12. Diodes D11a to D11c, D12a to D12c are connected, in anti-parallel with transistors Q11a to Q11e, Q12a to Q12c, respectively.

Bidirectional switches S2a to S2c have their one terminals connected together to input terminal T13 and their other terminals connected to output terminals T14a to T14c, respectively. Each of bidirectional switches S2a to S2c includes transistors Q13, Q14 and diodes D13, D14 as shown in FIG. 6.

The collectors of transistors Q13, Q14 are connected to each other, the emitter of transistor Q13 is connected to input terminal T13, and the emitter of transistor Q14 is connected to output terminal T14a (or T14b, or T14c). Diodes D13, D14 are connected in anti-parallel with transistors Q13, Q14, respectively.

Transistors Q11a to Q11c are controlled by PWM signals φ11a, φ11b, φ11c from the control device (not shown), respectively. The waveforms of PWM signals φ11a, φ11b, φ11c are similar to that of PWM signal φ11 shown in FIG. 7(b). The phases of PWM signals φ11a, φ11b, φ11c are synchronized with the phases of three-phase AC voltages VU. VV, VW, respectively, and shifted from each other by 120 degrees.

Transistors Q12a to Q12c are controlled by PWM signals φ12a, φ12b, φ12c from the control device (not shown), respectively. The waveforms of PWM signals φ12a, φ12b, φ12c are similar to that of PWM signal φ12 shown in FIG. 7(c). The phases of PWM signals φ12a, φ12b, φ12c are synchronized with the phases of three-phase AC voltages VU, VV, VW shown in FIG. 7(c), respectively, and shifted from each other by 120 degrees.

Transistors Q13 in bidirectional switches S2a to S2c are controlled by PWM signals φ13a, φ13b, φ13c from the control device (not shown), respectively. As shown in FIG. 7(d), PWM signals φ13a, φ13b, φ13c are complementary signals to PWM signals φ11a, φ11b, φ11c, respectively.

Transistors Q14 in bidirectional switches S2a to S2c are controlled by PWM signals φ14a, φ14b, φ14c from the control device (not shown), respectively. As shown in FIG. 7(c), PWM signals φ14a, φ14b, φ14c are complementary signals to PWM signals φ12a, φ12b, φ2c, respectively.

That is, input terminals T11 to T13, output terminal T14a, transistors Q11a, Q12a, diodes D11a, D12a, and bidirectional, switch S2a constitute the inverter shown in FIG. 6 to convert DC voltages V1 to V3 into AC voltage V4a to be output to output terminal T14a.

Input terminals T11 to T13, output terminal T14b, transistors Q11b, Q12b, diodes D11b, D12b, and bidirectional switch S2b constitute the inverter shown in FIG. 6 to convert DC voltages V1 to V3 into AC voltage V4b to be output to output terminal T14b.

Input terminals T11 to T13, output terminal T14c, transistors Q11c, Q12c, diodes D11e, D12c, and bidirectional switch S2c constitute the inverter shown in FIG. 6 to convert DC voltages V1 to V3 into AC voltage V4e to be output to output terminal T14c. AC voltages V4a to V4c change in synchronization with three-phase AC voltages VU, VV, VW, and the phases of AC voltages V4a to V4c are shifted from each other by 120 degrees.

As explained in the second embodiment, transistors Q11a to Q11c, Q12a to Q12c and diodes D13, D14 in bidirectional switches S2a to S2c are formed of a wide-bandgap semiconductor, and diodes D11a to D11c, D12a to D12c and transistors Q13, Q14 in bidirectional switches S2a to S2c are formed of a semiconductor other than wide-bandgap semiconductors. The rated current of each of transistors Q11a to Q11c, Q12a to Q12c is larger than the rated current of each of transistors Q13, Q14 and diodes D13, D14.

During normal operation in which three-phase AC power is supplied normally from commercial AC power source 20, inverter 24 converts DC power generated m converter 22 into three-phase AC power. During a power failure in which the supply of AC power from commercial AC power source 20 is stopped, inverter 24 converts DC power supplied from battery B11 through bidirectional chopper 23 into three-phase AC power.

In other words, inverter 24 generates three-phase AC voltages V4a to V4c based on DC voltages V1 to V3 supplied from converter 22 through buses L1 to L3 during normal operation and generates three-phase AC voltages V4a to V4c based on DC-voltages V1 to V3 supplied from battery B11 through bidirectional chopper 23 and buses L1 to L3 during a power failure.

As shown in FIG. 13, output filter 25 includes reactors 51 to 53 and capacitors 54 to 56. Reactors 51 to 53 have their one terminals connected to output terminals T14a to T14c of inverter 24, respectively, and their other terminals connected to load 26. Capacitors 54 to 56 have their one electrodes connected to the other terminals of reactors 51 to 53, respectively, and their other electrodes connected together to neutral point NP. Reactors 51 to 53 and capacitors 54 to 56 constitute a low pass filter.

Output filter 25 allows AC power of a commercial, frequency, of AC power output from inverter 24, to pass through load 26 and prevents a signal of a carrier frequency generated in inverter 24 from passing toward load 26. In other words, output filter 25 converts output voltages V4a to V4c of inverter 24 info sine-wave three-phase AC voltages VR, VS, VT of a commercial frequency to be supplied to load 26. Load 26 is driven by three-phase AC voltages VR, VS, VT.

The control device (not shown) controls converter 22, bidirectional chopper 23, and inverter 24 by supplying PWM signal while monitoring three-phase AC voltages VU, VV, VW from commercial AC power source 20, three-phase AC voltages VR, VS, VT output to load 26, DC voltages V1 to V3, the terminal-to-terminal voltage of battery B11, and the like.

The operation of this uninterruptible power supply device will now be described. During normal operation in which three-phase AC power is supplied normally from commercial AC power source 20, the AC power from commercial AC power source 20 is supplied to converter 22 through input filter 21 and converted into DC power by converter 22. The DC power generated in converter 22 is stored into battery B11 through bidirectional chopper 23, supplied to inverter 24, and converted into three-phase AC power of a commercial frequency by inverter 24. The three-phase AC power generated by inverter 24 is supplied to load 26 through output filter 25 to bring load 26 into operation.

During a power failure in which the supply of AC power from commercial AC power source 20 is stopped, the operation of converter 22 is stopped, and DC power of battery B11 is supplied to inverter 24 through bidirectional chopper 23 and converted into three-phase AC power of a commercial frequency by inverter 24. The three-phase AC power generated in inverter 24 is supplied to load 26 through output filter 25 to keep load 26 operating.

Therefore, even when a power failure occurs, the operation of load 26 continues as long as DC power is stored In battery B11. When the supply of AC power from commercial AC power source 20 is resumed, the operation of converter 22 is resumed, and DC power generated in converter 22 is supplied to battery B11 through chopper 23 and to inverter 24 to restore the original state. The present fifth embodiment also achieves the same effects as in the first to fourth embodiments.

The embodiments disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST

T0, T0a to T0c, T11 to T13 input terminal, T1 to T3, T14, T14a to T14c output terminal, T21 to T25 terminal, Q1, Q11 to Q14, Q11a to Q11c, Q12a to Q12c, Q21 to Q24 transistor, D1 to D6, D1a to D1c, D2a to D2c, D11 to D14, D11a to D11c, D12a to D12c, D21 to D24 diode, B1, B2, B11 battery, M1, M2 semiconductor module, L21 input filter, 2, 22 converter, L1 DC positive bus, L2 DC negative bus, L3 DC neutral point bus, C1, C2, 34 to 36, 54 to 56 capacitor, 3, 24 inverter, 4, 25 output filter, 5 control device, 10, 20 commercial AC power source, 11, 26 load, 23 bidirectional chopper, 31 to 33, 51 to 53 reactor, S1a to S1c, S2a to S2c bidirectional switch, 40 normal mode reactor, 41, 42 coil.

The invention claimed is:

1. A converter configured to convert alternating-current voltage applied to an input terminal into first to third direct-current voltages to be output to first to third output terminals, respectively, comprising:
a first diode having an anode and a cathode connected to the input terminal and the first output terminal, respectively;
a second diode having an anode and a cathode connected to the second output terminal and the input terminal, respectively; and
a first bidirectional switch connected between the input terminal and the third output terminal,
the first direct-current voltage being higher than the second direct-current voltage, and the third direct-current voltage being an intermediate voltage between the first direct-current voltage and the second direct-current voltage,
the first bidirectional switch including third to sixth diodes and a first transistor,
the third diode having an anode connected to the input terminal and a cathode connected to a first electrode of the first transistor, and the fourth diode having an anode connected to the third output terminal and a cathode connected to the first electrode of the first transistor,
the fifth diode having a cathode connected to the input terminal and an anode connected to a second electrode of the first transistor, and the sixth diode having a cathode connected to the third output terminal and an anode connected to the second electrode of the first transistor, the first transistor being turned on or off in a predetermined cycle,
the first diode, the second diode, and the first transistor being each formed of a wide-bandgap semiconductor, and
the third to sixth diodes being each formed of a semiconductor other than wide-bandgap semiconductors.

2. The converter according to claim 1, further comprising a semiconductor module including the first to sixth diodes and the first transistor.

3. The converter according to claim 1, wherein rated current of each of the first and second diodes is greater than rated current of each of the third to sixth diodes and the first transistor.

4. The converter according to claim 1, wherein the wide-bandgap semiconductor is SiC, and the semiconductor other than wide-bandgap semiconductors is Si.

5. A power conversion device comprising:
the converter of claim 1; and
an inverter configured to convert first to third direct-current voltages applied to the first to third output terminals, respectively, into alternating-current voltages in three levels to he output to a fourth output terminal,
the inverter comprising
a second transistor having first and second electrodes connected to the first and fourth output terminals, respectively,
a third transistor having first and second electrodes connected to the fourth and second output terminals, respectively,
seventh and eighth diodes connected in anti-parallel with the second and third transistors, and
a second bidirectional switch connected between the third output terminal, and the fourth output terminal,
the second bidirectional switch including fourth and fifth transistors and ninth and teeth diodes,
the second transistor; the third transistor, the ninth diode, and the tenth diode being each formed of the wide-bandgap semiconductor, and
the fourth transistor, the fifth transistor, the seventh diode, and the eighth diode are each formed of the semiconductor other than wide-bandgap semiconductors.

6. The power conversion device according to claim 5, wherein
the fourth transistor has a first electrode connected to a first electrode of the fifth transistor and a second electrode connected to the third output terminal, and the fifth transistor has the first electrode connected to the first electrode of the fourth transistor and a second electrode connected to the fourth output terminal,
the ninth and tenth diodes are connected in anti-parallel with the fourth and fifth transistors, respectively,
when the first and third direct-current voltages are alternately output to the fourth output terminal, the fifth transistor is turned on and the second and fourth transistors are alternately turned on, and
when the second and third direct-current voltages are alternately output to the fourth output terminal, the fourth transistor is turned on and the third and fifth transistors are alternately turned on.

7. The power conversion device according to claim 5, wherein
the fourth transistor has a first electrode connected to the fourth output terminal and a second electrode connected to a second electrode of the fifth transistor, and the fifth transistor has a first electrode connected to the third output terminal and the second electrode connected to the second electrode of the fourth transistor,
the ninth and tenth diodes are connected in anti-parallel with the fourth and fifth transistors, respectively,
when the first and third direct-current voltages are alternately output to the fourth output terminal, the fifth transistor is turned on and the second and fourth transistors are alternately turned on, and
when the second and third direct-current voltages are alternately output to the fourth output terminal, the fourth transistor is turned on and the third and fifth transistors are alternately turned on.

8. The power conversion device according to claim 3, wherein
the fourth transistor has a second electrode connected to the third output terminal, and the fifth transistor has a second electrode connected to the fourth output terminal,
the ninth diode has an anode connected to the third output terminal and a cathode connected to a first electrode of the fifth transistor, and the tenth diode has an anode connected to the fourth output terminal and a cathode connected to a first electrode of the fourth transistor,
when the first and third direct-current voltages are alternately output to the fourth output terminal, the fifth transistor Is turned on and the second and fourth transistors are alternately turned on, and
when the second and third direct-current voltages are alternately output to the fourth output terminal, the fourth transistor is turned on and the third and fifth transistors are alternately turned on.

9. The power conversion device according to claim 5, wherein the inverter comprises a semiconductor module including the second to fifth transistors and the seventh to tenth diodes.

10. The power conversion device according to claim 5, wherein rated current of each of the second and third transistors is larger than rated current of each of the fourth and fifth transistors and the seventh to tenth diodes.

11. The power conversion device according to claim 5, wherein the wide-bandgap semiconductor is SiC, and the semiconductor other than wide-bandgap semiconductors is Si.

* * * * *